United States Patent Office 3,287,338
Patented Nov. 22, 1966

3,287,338
ANHYDRIDES OF DIPEROXY DICARBOXYLIC ACIDS AND THEIR USE AS POLYMERIZATION CATALYSTS
James E. Guillet, Kingsport, Tenn., assignor to Eastman Kodak Company, Rochester, N.Y., a corporation of New Jersey
No Drawing. Filed Dec. 14, 1962, Ser. No. 244,592
5 Claims. (Cl. 260—89.1)

This invention relates to novel compositions of matter. More particularly, this invention relates to a novel class of organic peroxides which are mixed anhydrides of diperoxy acids with other organic acids. In a specific aspect, this invention relates to organic peroxides which are of special utility in the polymerization of ethylenically unsaturated polymerizable compounds such as ethylene, acrylates, vinyl esters and the like.

In many commercial polymerizations, such as the polymerization of ethylene or styrene, for example, free radical catalysts or promoters such as di-t-butyl peroxide, lauroyl peroxide and tertiary butyl peracetate are employed. It is general practice when such compounds are employed to use very small concentrations so that the catalyst or promoter residues left in the polymer do not have to be removed therefrom after polymerization is completed. However, certain of the residues of these free radical promoters contain functional groups, such as acid or ester carbonyl, which tend to adversely affect the electrical properties of the polymer product. For example, in producing polyethylene in this manner the presence of acid or ester carbonyl tends to increase the dielectric loss factor of the polymer and this seriously interferes with its use in electrical applications such as in telephone-wire insulation, high-frequency cables, television cables and the like. Consequently, it is highly desirable to provide a catalyst for the polymerization of ethylenically unsaturated monomers such as ethylene which gives a very high yield of polymer per gram of catalyst or promoter. This will, of course, reduce the total amount of any undesirable residues left in the polymer after polymerization is completed.

Accordingly, it is an object of this invention to provide a new and improved class of organic peroxides, particularly organic peroxides which function as catalysts with a high degree of efficiency in the polmyerization of ethylenically unsaturated polymerizable compounds.

Another object of this invention is to provide organic peroxide promoters which are especially efficacious in the polymerization of ethylenically unsaturated polymerizable compounds such as ethylene, styrene, methyl methacrylate and other acrylates, vinyl acetate and other vinyl esters.

Another object of this invention is to provide a new class of organic peroxide promoters for the production of polymers from ethylene, styrene, acrylates and the like which will have substantially reduced contamination resulting from catalyst residues.

A further object is to provide a new class of organic peroxides having utility in promoting other free radical reactions such as chlorination, bromination, telomerization and the like.

Still another object of this invention is to provide polymerization process employing organic peroxide catalysts exhibiting excellent efficiency.

Other objects will become apparent upon an examination and consideration of the specification and claims that follow.

The novel organic peroxides of this invention can be illustrated by the general formula:

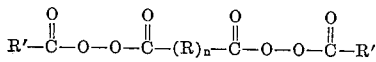

where R is a divalent organic radical, desirably containing 1–20 carbon atoms, R′ is the same or different monovalent organic radical, desirably containing 4–20 carbon atoms and $n$ is 0 or 1. It can be seen, therefore, that the novel organic peroxides of this invention are mixed anhydrides of a diperoxy polycarboxylic acid with a carboxylic acid containing up to 21 carbon atoms in the acyl radical.

As already indicated the divalent R groups in the above formula are organic and usually contain 1–20 carbon atoms. In general, the aliphatic, cycloaliphatic or aromatic radicals containing 1–20 carbon atoms will give good results although alkylene, cycloalkylene and arylene radicals which contain up to 10, and most preferably 1–6 carbon atoms, are preferred. The R radicals which are found to be most suitable in polymerization catalysts contain at least 4 carbon atoms and are hydrocarbon, but non-hydrocarbon substituents which can also be present and which do not deleteriously affect the composition are exemplified by alkoxy, carbonyl, ester, carboxyl, nitro, amino, halogen, hydroxy and the like. Suitable R groups include, for example, methylene, tetramethylene, phenylene, nitro and chlorophenylene, biphenylene, butenylene, methylphenylene, cyclohexenylene, cyclohexylene, methoxyphenylene, phenylethylene, phenylenedimethylene, naphthylene, nonadecylene, eicosylene and the like.

The R′ groups in the above formula can be the same or different monovalent organic radicals and usually contain 4–20 carbon atoms. These groups can, however, be aliphatic, cycloaliphatic or aromatic groups containing fewer carbon atoms, for example, 1–14, or even 5–10 carbon atoms. Like the R groups, the most suitable R′ groups for polymerization catalysts contain at least 4 carbon atoms and are hydrocarbon although non-hydrocarbon substituents such as alkoxy do not deleteriously affect the compositions and can, therefore, be present. Suitable R′ groups include, methyl, ethyl, propyl, isopropyl, butyl, decyl, dodecyl, tetradecyl, eicosyl, cyclopentyl, cyclohexenyl, cycloheptyl, tolyl, methyl, propyl and dibutyl substituted phenyl, naphthyl and the like. Examples of the novel peroxides of this invention are the anhydride of peroxysuccinic acid with lauric acid, the anhydride of peroxyterephthalic acid with acetic acid, the anhydride of peroxyoxalic acid with propionic acid and the like.

The novel peroxides of this invention can be prepared by several different methods. Thus, they can be prepared by reacting a peracid such as perlauric or peracetic acid with the dichloride of a dibasic acid such as oxalic, succinic, terephthalic, adipic, etc. The reaction can be carried out in an alkaline medium such as a pyridine solution. Alternatively, these novel compounds can be prepared by reacting a dibasic peracid with a monobasic acid chloride under the same alkaline conditions. The peroxides of this invention can also be prepared by reacting metal salts of the peracids, e.g. sodium or potassium salts, with acyl halides in slurry in an inert organic solvent such as benzene, hexane or heptane and filtering off the metal halide. The peracids can also be reacted with the acyl halides in organic media such as hexane or benzene using aqueous sodium or potassium hydroxide in place of pyridine. Other preparative methods will be obvious to those skilled in the art. The detailed preparation of several of the novel organic peroxides of this invention are set forth in the following examples.

Solutions of the novel peroxides of this invention are usually stable at low temperatures and can be easily stored for long periods if reasonable precautions are taken to avoid overheating or exposure to flame or ultraviolet light. These peroxides can be used in solution or in bulk polymerization over a broad temperature range, as for example about 0° C. to about 250° C. or above. In general, these peroxides give yields of from 2 to 5 times more polymer per gram of catalyst than do peroxides commonly used as catalysts for the polymerization of vinyl monomers. It will be understood, of course, that the novel peroxides disclosed herein can be used to polymerize ethylenically unsaturated monomers at temperatures in the range of about 0° to about 250° C. or above, but that all of these peroxides will not have the same activity at the same temperature. For example, those containing substituents alpha to the carbonyl groups will generally be more effective catalysts at lower temperatures than those in which the alpha carbons contain only hydrogen. Furthermore, compounds in which the R' groups in the above structural formula are radicals containing from 1–3 carbon atoms will be sensitive to mechanical shock, and therefore, should be handled with care. Because such peroxides decompose quickly to give large volumes of gaseous products they are of the great interest as explosives or propellants, but of limited interest as polymerization catalysts.

Although the novel peroxides of this invention are of particular interest as catalysts or promoters for the polymerization of ethylenically unsaturated monomers, they may also be used in any of the usual processes requiring peroxide or free-radical generators, such as, for example, in catalyzing the chlorination of hydrocarbons, in bleaching various materials, in cross-linking various polymer resins and the like.

The following procedures are typical of those which can be employed in accordance with the invention in the polymerization of various ethylenically unsaturated polymerizable compounds.

(A) The polymerization of ethylene is accomplished as follows: A 100-cc. stainless steel autoclave equipped with a magnetic agitator is charged with the catalyst in toluene solution. The autoclave is flushed with ethylene, then pressured to the desired level and the temperature raised to reaction temperature. The reaction pressure is maintained by addition of compressed gas for a period of two hours after which time the reactor is cooled down and the unreacted ethylene vented. The polymer is recovered from the autoclave in the form of a dry, spongy mass.

(B) The polymerization of ethylenically unsaturated monomers other than ethylene can be accomplished as follows: One-tenth gram of the peroxide in toluene solution is placed in a vial and the toluene removed by pumping under vacuum. Twenty grams of purified monomer is charged and the vial sealed after flushing with nitrogen. The vials are heated for four hours at the desired reaction temperature, then cooled to room temperature and opened. The polymer is dissolved in a suitable solvent such as acetone, toluene or benzene, precipitated with methanol, filtered, dried and weighed.

This invention can be further illustrated by the following examples of preferred embodiments thereof although it will be understood that these examples are included merely for purposes of illustration and are not intended to limit the scope of the invention unless otherwise specifically indicated.

*Example 1*

The dianhydride of diperoxysuccinic acid with lauric acid is prepared by reaction of perlauric acid with succinyl chloride in solution in toluene with pyridine. After reaction for 1 hour at 0° C. the toluene layer is separated from the reaction mixture and washed with water until neutral. The yield of the peranhydride is 41 percent based on reaction of the peroxy groups with potassium iodide and titration of the iodine liberated with sodium thiosulfate solution.

Polymerization runs with the peroxide prepared above are made with ethylene as described in Procedure A. Using 2 mg. of catalyst and a pressure of 20,000 lbs./sq. in., in the following yields are obtained at the temperatures indicated:

| Temp., °C. | Yield, g. | Catalyst Efficiency, g./g. catalyst |
|---|---|---|
| 105 | 8.8 | 4,400 |
| 125 | 9.41 | 4,700 |
| 145 | 16.2 | 8,100 |
| 180 | 20.6 | 10,300 |

To illustrate the improvement in efficiency obtained by the use of the new organic peroxides of the instant invention over the use of conventional prior art peroxide catalysts, the above procedure is repeated using lauroyl peroxide. The results obtained are indicated in the following table.

| Temp., °C. | Yield, g. | Catalyst Efficiency, g./g. catalyst |
|---|---|---|
| 125 | 0.81 | 450 |
| 145 | 1.32 | 660 |
| 180 | 3.2 | 1,600 |

*Example 2*

The dianhydride of caproic acid and diperoxyoxalic acid is made by reaction of percaproic acid with oxalyl chloride and pyridine in toluene solution. The yield of peroxide is 55 percent. Polymerization runs are made according to Procedure A using this peroxide with ethylene at 20,000 lbs./sq. in. pressure using 2 mg. of the catalyst. The results are as follows:

| Temp., °C. | Yield, g. | Efficiency, g./g. |
|---|---|---|
| 120 | 8.4 | 4,200 |
| 140 | 6.9 | 3,450 |
| 180 | 18.4 | 9,200 |

*Example 3*

The dianhydride of benzoic acid and diperoxysuccinic acid is prepared by reaction of perbenzoic acid with succinyl chloride and pyridine in toluene solution. After washing with water, the yield of peroxide is 57 percent. The dianhydride of benzoic acid and diperoxysuccinic acid is used as a catalyst for the polymerization of styrene, methyl methacrylate, and vinyl acetate at 100° C. using Procedure B described above. The yields and viscosities of the resulting polymers are as follows:

| Monomer | Yield, g. | Viscosity |
|---|---|---|
| Styrene | 19.6 | 0.61 |
| Methyl methacrylate | 17.8 | 1.33 |
| Vinyl acetate | 19.2 | 0.41 |

*Example 4*

The dianhydride of 2,4-dichlorobenzoic acid and diperoxyadipic acid is prepared by reaction of 2,4-dichloroperoxybenzoic acid with adipolyl chloride in pyridine solution. After washing with water to remove the pyridine, the yield of peroxide is 67 percent. Polymerization runs with this peroxide using styrene, methyl methacrylate, and vinyl acetate are carried out using the above Procedure B at 90° C. The yields and viscosities of the polymers are as follows:

| Monomer | Yield, g. | Viscosity |
|---|---|---|
| Styrene | 19.7 | 0.62 |
| Methyl methacrylate | 19.2 | 1.59 |
| Vinyl acetate | 18.5 | 0.53 |

Example 5

The anhydride of lauric acid with diperoxydimethylmalonic acid is prepared by the following procedure:

1.90 g. perlauric acid is dissolved in 10 cc. pyridine and the solution cooled to 3° C. A solution of 0.642 g. dimethyl malonyl chloride in 10 cc. heptane is added and the temperature maintained at 3–5° C. During the addition a white precipitate forms which becomes yellow as the addition progresses. The mixture is stirred for 2 hours at 5° C. after which 10 ml. heptane is added and stirring continued for 15 minutes. About 50 ml. water is added and the organic layer separated and extracted with 3 portions of 5 percent hydrochloric acid to remove the pyridine. The heptane layer is washed 3 times with 25 ml. portions of 5 percent sodium hydroxide solution to remove any unreacted perlauric acid, then with water until neutral and dried over anhydrous magnesium sulfate. The solution is titrated with KI and indicates a 29 percent yield of the peroxide.

The rate of decomposition of the peroxide is determined by heating a 0.5 percent solution in light weight mineral oil at various temperatures and determining the amount of undecomposed peroxide iodimetrically. The half-life at various temperatures is shown below:

| Temperature, ° C. | Half-life (sec.) |
|---|---|
| 90 | 3700 |
| 130 | 26 |
| 140 | 10 |
| 150 | 8.5 |

Polymerization runs with ethylene at 20,000 p.s.i. are made as described in Procedure A. The following results are obtained using 1 mg. catalyst in each case.

| Temperature °C. | Yield (g.) | Catalyst Efficiency. g./g. |
|---|---|---|
| 100 | 0.50 | 500 |
| 140 | 4.20 | 4,200 |
| 180 | 9.25 | 9,250 |

Example 6

The anhydride of lauric acid with diperoxy 1,4-cyclohexane dicarboxylic acid is prepared in 45 percent yield by reaction of perlauric acid with the acid chloride of 1,4-cyclohexane dicarboxylic acid using the procedure of Example 1. The product is used as a polymerization catalyst according to Procedure B with styrene at 90° C. The yield of polymer is 98 percent in 30 minutes.

Example 7

The anhydride of 2-ethylhexanoic acid with diperoxy succinic acid is prepared in 25 percent yield by reacting 2-ethylhexanoyl chloride with diperoxy succinic acid by the procedure of Example 1 except that the temperature is maintained below 0° C. The product shows two separate carbonyl peaks in the infra-red region of 5.8 to 6.0μ. The peroxide decomposes rapidly at room temperature. A 50 percent yield of polymethyl methacrylate is obtained by Procedure B using a temperature of 35° C. for 1 hour.

Example 8

The anhydride of 2 nonenoic acid with diperoxy succinic acid is prepared in 70 percent yield by reacting 2 nonenoyl chloride with diperoxy succinic acid by the procedure of Example 1. The peroxide shows two carbonyl peaks in the range 5.6 to 6.0μ and a band at 6.1μ.

Example 9

The anhydride of p-nitrobenzoic acid with diperoxy adipic acid is prepared by reacting p-nitrobenzoyl chloride with diperoxy adipic acid. The peroxide shows two carbonyl bands in the infra-red in the range from 5.8 to 6.1μ.

Example 10

The dianhydride of lauric acid with diperoxy dimethyl malonic acid is prepared by reacting 2.10 g. of sodium perlaurate slurried in 20 cc. heptane with 0.64 gram of dimethyl malonyl chloride at 0° C. The dimethyl malonyl chloride is added dropwise in 5 cc. heptane over a period of 20 minutes and the reaction is continued for 6 hours at 0° C., after which the reaction mixture is washed with 2 percent KOH solution and water until neutral. Titration of the resulting heptane solution indicates a yield of 74 percent of the desired peroxide.

From the above examples it can be seen that the novel peroxides of this invention are readily identifiable by their ability to quantitatively liberate iodine from potassium iodide, which can be used to determine the yield of peroxide, and by their characteristic infra-red spectrum which shows two carbonyl bands, generally in the range of 5.6 to 6.1μ.

As shown by the examples and description set forth above it will be apparent that the novel organic peroxides of our invention containing at least 4 carbon atoms in the R′ groups can be employed in the polymerization of a wide variety of ethylenically unsaturated polymerizable compounds, preferably containing 2–10 carbon atoms and a $CH_2=C<$ group, or more preferably a $CH_2=C$-group, and that such polymerizations can be carried out under varying conditions of temperature and pressure. As obvious to those skilled in the art, the specific conditions will be selected by reference to the particular organic peroxide employed in a given polymerization although temperatures in the range of about 0° to about 250° C., or above, can generally be employed. In addition, temperatures of about 20°–30° C. are often employed. The pressures generally range from about atmospheric pressure to about 3,000 atmospheres, with pressures of at least 1500 atmospheres usually being employed with ethylene. The polymerization reaction can be carried out in the presence of from 5 parts per million to 5%, by weight, of catalyst, based on monomer feed.

Thus, this invention provides an unusually valuable class of organic peroxides which can be employed as catalysts for free radical reactions. These new peroxides are characterized by unexpectedly high efficiencies and shock insensitivity. Since it is well known that free radical reactions suffer from relatively low efficiencies in many cases, the provision of catalysts having the unusually high efficiency of the peroxides of this invention will make many processes commercially feasible which are now considered to be too expensive for commercial utility. In the case of polyethylene and polystyrene and other vinyl polymers, it will be obvious that a substantial improvement in polymer properties will be made possible as a result of the substantially lower amount of catalyst residues present in the final product which are a result of the high efficiencies of the peroxides of this invention when used as polymerization promoters.

Although the invention has been described in considerable detail with particular reference to certain preferred embodiments thereof, variations and modifications can be effected within the spirit and scope of the invention as described hereinabove, and as defined in the appended claims.

I claim:
1. The process of polymerizing an unsaturated polymerizable compound containing a $CH_2=C<$ group which comprises polymerizing said compound at a temperature in a range of about 0° C. to about 250° C. in the presence of an organic peroxide having the formula:

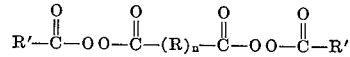

where each R is a member selected from the group consisting of divalent aliphatic, cycloaliphatic and aromatic radicals containing 1 to 20 carbon atoms, each R' is a member selected from the group consisting of the monovalent aliphatic, cycloaliphatic, and aromatic radicals containing 4 to 20 carbon atoms and $n$ is a whole integer from 0 to 1.

2. The process of claim 1 in which the organic peroxide is the dianhydride of diperoxysuccinic acid with lauric acid.

3. The process of claim 1 in which the organic peroxide is the dianhydride of caproic acid with diperoxyoxalic acid.

4. The process of claim 1 in which the organic peroxide is the dianhydride of benzoic acid with diperoxysuccinic acid.

5. The process of claim 1 in which the organic peroxide is the dianhydride of terephthalic acid with peracetic acid.

UNITED STATES PATENTS

References Cited by the Examiner

| | | | |
|---|---|---|---|
| 2,592,069 | 4/1952 | Reid et al. | 260—89.1 |
| 2,858,326 | 10/1958 | Ashby | 260—453 |
| 2,862,973 | 12/1958 | Winkler et al. | 260—610 |
| 3,003,000 | 10/1961 | Milas | 260—610 |
| 3,062,797 | 11/1962 | Stanek | 260—89.1 |
| 3,108,093 | 10/1963 | Pajaczkowski | 260—94.9 |

OTHER REFERENCES

Hawkins Organic Peroxides, pp. 345–54 Spon London (1961) (QD305 H1 H38).

JOSEPH L. SCHOFER, *Primary Examiner*.

WILLIAM H. SHORT, *Examiner*.

J. F. McNALLY, W. HOOVER, *Assistant Examiners*.